B. F. CHAMBERLIN, Jr. & J. N. MOULTON.
APPARATUS FOR TREATING COATED FABRICS.
APPLICATION FILED MAR. 9, 1910.

1,131,993.

Patented Mar. 16, 1915.

Witnesses:
P. W. Pezzetti
Gertrude L. Johnson

Inventors
Benjamin F. Chamberlin Jr.
James N. Moulton
by their Attys.

B. F. CHAMBERLIN, Jr. & J. N. MOULTON.
APPARATUS FOR TREATING COATED FABRICS.
APPLICATION FILED MAR. 9, 1910.

1,131,993. Patented Mar. 16, 1915.
6 SHEETS—SHEET 6.

UNITED STATES PATENT OFFICE.

BENJAMIN F. CHAMBERLIN, JR., OF BOSTON, AND JAMES N. MOULTON, OF HAVERHILL, MASSACHUSETTS, ASSIGNORS TO MASSACHUSETTS CHEMICAL COMPANY, OF BOSTON, MASSACHUSETTS, A CORPORATION OF MAINE.

APPARATUS FOR TREATING COATED FABRICS.

1,131,993.  Specification of Letters Patent.  Patented Mar. 16, 1915.

Application filed March 9, 1910. Serial No. 548,242.

*To all whom it may concern:*

Be it known that we, BENJAMIN F. CHAMBERLIN, Jr., and JAMES N. MOULTON, of Boston and Haverhill, respectively, in the counties of Suffolk and Essex, respectively, and State of Massachusetts, have invented certain new and useful Improvements in Apparatus for Treating Coated Fabrics, of which the following is a specification.

This invention has relation to apparatus which may be used for softening or rendering adhesive the coated surface of a rubber-coated fabric such as that used in the manufacture of inner soles.

One object of the invention is to provide an apparatus especially adapted to be used when a highly volatile solvent is to be employed for softening the coated surface of the fabric. It is essential, when a highly volatile solvent is employed, to preserve such solvent without danger of its evaporation and at the same time to provide convenient mechanism by which the solvent may be applied to the face of the coating of the fabric.

The apparatus described and illustrated, as intended for use with a highly volatile solvent, is so constructed and arranged as to preserve the supply of solvent from contact with the atmosphere and to apply the solvent to the coated surface of the fabric in such a manner that the solvent passes directly from the reservoir to the coated surface without becoming exposed to the atmosphere.

Fabric coated with a layer of rubber, gutta percha, or any compound containing either, has a tendency to curl or bulge, and it is therefore difficult to apply the solvent uniformly over the coated surface unless the surface is entirely flat. For this reason, the apparatus herein illustrated is provided with coöperative members of which one is movable toward and from the other, said members having flat opposed surfaces between which the coated fabric is compressed. That member which engages the coated surface of the fabric is composed of absorbent material which is impregnated with the solvent and to which the solvent is delivered. The pressure of one of said members causes the coated fabric to assume a flat condition while passing between said members, and the solvent may therefore be uniformly applied to all parts of the coated surface.

Referring to the accompanying drawings, which illustrate various forms in which the invention may be embodied.

The same reference characters indicate the same parts wherever they occur.

Referring first to the form shown by Figs. 1 to 4 inclusive, a reservoir is indicated at 15. This reservoir is provided for storing a supply of solvent and is entirely closed to the atmosphere except as hereinafter specified. A work-support or bed is indicated at 16 and is arranged upon a bench 17 or any other appropriate supporting structure. A body 18 of absorbent material such as felt is stationarily supported by any suitable means above the bed 16. 20 indicates a strip of fabric of which one surface is coated with a layer of gutta percha or rubber or a compound and which for convenience is stored in the form of a roll 21 and arranged so that in being drawn between the bed 16 and the body 18 of absorbent material, the coated surface lies uppermost in position to be engaged by the absorbent material. The body 18 of absorbent material is, in this embodiment of the invention, supported by a take-up device which includes a pin or rod 22 and a loop or strap 23 suspended from the rod 22 and attached to one end of the absorbent material, a winding roll 24 and a strap 25 attached to the other end of the absorbent material and wound upon the roll. The winding drum is provided with a handle 26, a ratchet 27 and a retaining pawl 28, and is mounted upon the top plate 29 supported by legs 30 resting upon the bench 17. The top plate as here shown supports not only the absorbent material 18, and its take-up device but also supports the reservoir 15 and valve mechanism controlling the discharge of solvent from the reservoir and means for conducting the solvent and distributing it to various parts of the absorbent material. The central part of the top plate is formed with an upstanding neck 31. The neck is centrally bored to form a valve chamber 32 and valve seat 33. A bore 34 of smaller diameter extends from the valve seat to the bottom surface of the plate 29, and registers with an opening 35 in one branch of a distributing device 36. The distributing device consists of a plurality of branches of tubular form having a relatively large number of openings or ports in the lower wall thereof, the details of which are illustrated in another figure of the drawings and hereinafter described. The upper end of the neck 31 is closed by a cap 37 and the chamber 32 in the neck is occupied by a plunger 38 having a valve 39 coöperating with the valve seat 33. A spring 40 compressed between the cap 37 and a shoulder of the plunger exerts its tension to hold the valve 39 against the seat 33. The body of the plunger between the spring shoulder and the valve 39 is reduced in diameter and provides a conduit through which the solvent may flow. The surface of the valve is formed with a plurality of grooves 41 through which the solvent may flow when the valve is removed from its seat.

Figures 2, 3:
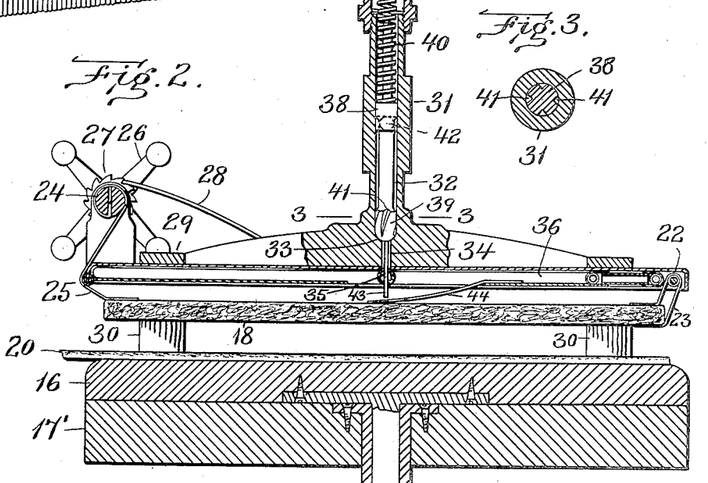
Fig. 2 represents on a larger scale a longitudinal section of the coöperative members included in Fig. 1.
Fig. 3 represents a section on line 3—3 of Fig. 2.
Figure 4:
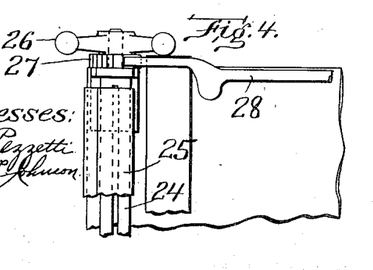
Fig. 4 represents a top plan view of a take-up device included in Figs. 1 and 2.

Solvent from the reservoir 15 is conducted to the valve chamber 32 through a pipe 42 and is completely closed from the atmosphere when the valve 39 is upon its seat. The valve stem 43 extends downwardly through the bore 34 and through that branch of the distributing device 36 which lies below the bore 34. A strip 44 interposed between the lower end of the stem 43 and the absorbent material 18 is adapted to be elevated and to thereby lift the valve 39 from its seat and admit solvent to the distributing device 36.

Figure 1:
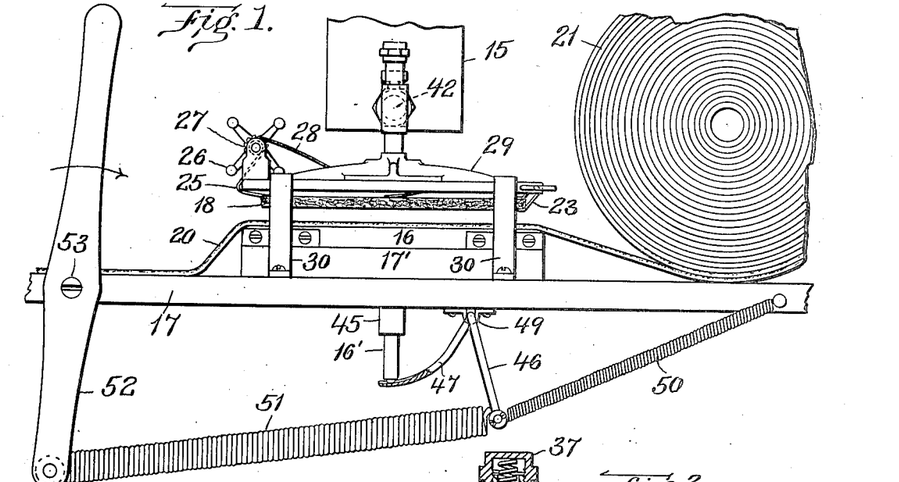
—Figure 1 represents a front elevation of the essential parts of an apparatus in which the lower or work-supporting member is manually movable and in which the upper or absorbent member is stationary.

The bed or work support 16 is provided with a downwardly extending stem 16' which is arranged to slide in a sleeve 45. The sleeve is affixed in a block 17' mounted upon the bench 17, and the bed 16 is therefore adapted to move up and down toward and from the absorbent material 18 and to move the strip 20 into engagement with the absorbent material. The mechanism illustrated for raising the bed 16 comprises a bell crank 46 having an arm 47 extending under the lower end of the stem 16'. The end of the stem may, if desired, be provided with a socket containing an anti-friction ball 48. The bell crank is fulcrumed at 49 and is connected to one end of the spring 50 by which the arm 47 is normally depressed. One end of a spring 51 is attached to the bell crank and the other end of said spring is connected to one end of a lever 52. The lever is fulcrumed at 53 and when moved in the direction of the arrow it effects an upward movement of the bed 16. The strip 20 lying between the bed and the absorbent material is thus raised into contact with the absorbent material and pressed firmly against it, raising it until the upward movement is arrested by engagement of the absorbent material with the bottom of the distributing device 36. The strip 44 is engaged and raised by the absorbent material and upward movement is imparted to the valve stem 43 by the strip, raising the valve from its seat and permitting discharge of solvent through the bore 34 into the distributing device. As soon, therefore, as the strip 20 is compressed between the bed and the absorbent material, the discharge of the solvent is effected by the upward movement of the absorbent material. The strip upon being drawn through the two members between which it is compressed receives a uniform application of solvent upon the coated surface. When a sufficient quantity of the strip has thus been supplied with solvent, the lever 52 may be released to permit the return of the bed 16 to its initial position. When the bed descends, the absorbent material 18 is permitted to drop sufficiently to permit the return of the valve 39 to its seat and thus shut off the discharge of solvent. In case the strip 20 has a tendency to curl or bulge, it is reduced to a flat state upon being compressed between the bed and the absorbent material by which the solvent is applied to it.

Figures 7, 15:
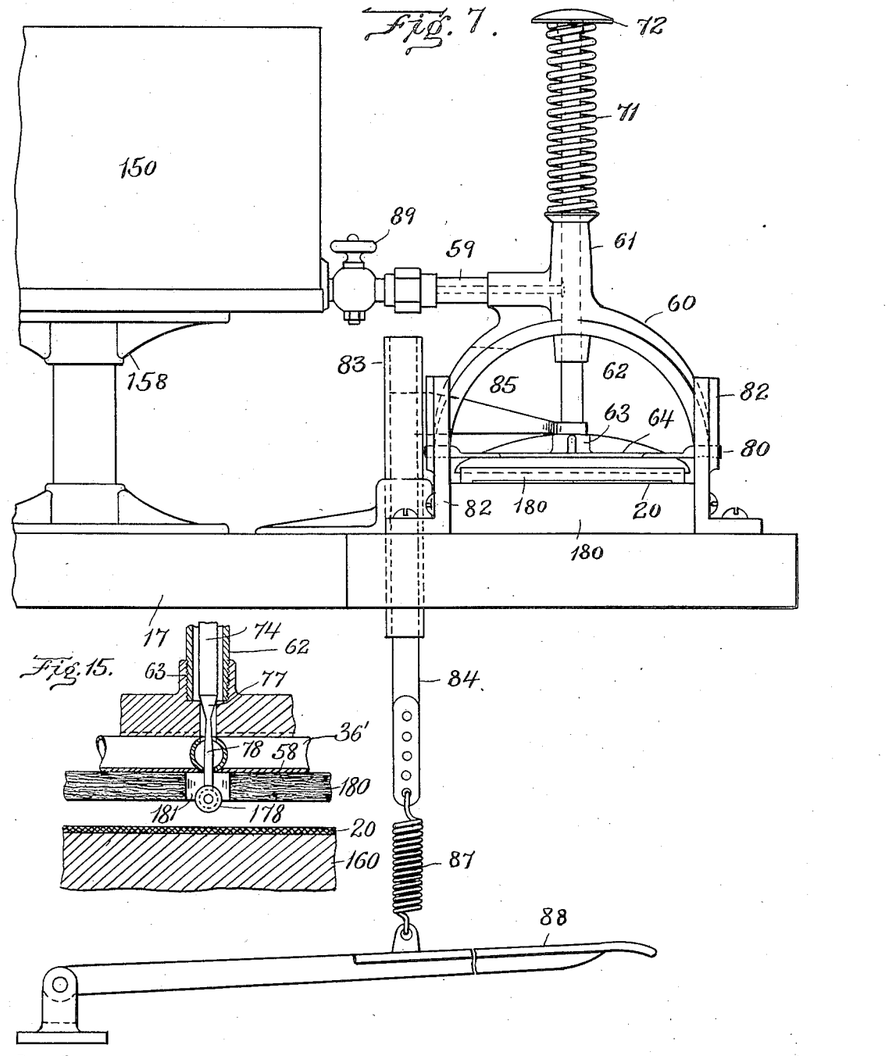
Fig. 7 represents an end elevation of the apparatus shown by Fig. 5.
Fig. 15 represents a modification in section, including various parts associated with the discharge valve.
Figures 8, 9:
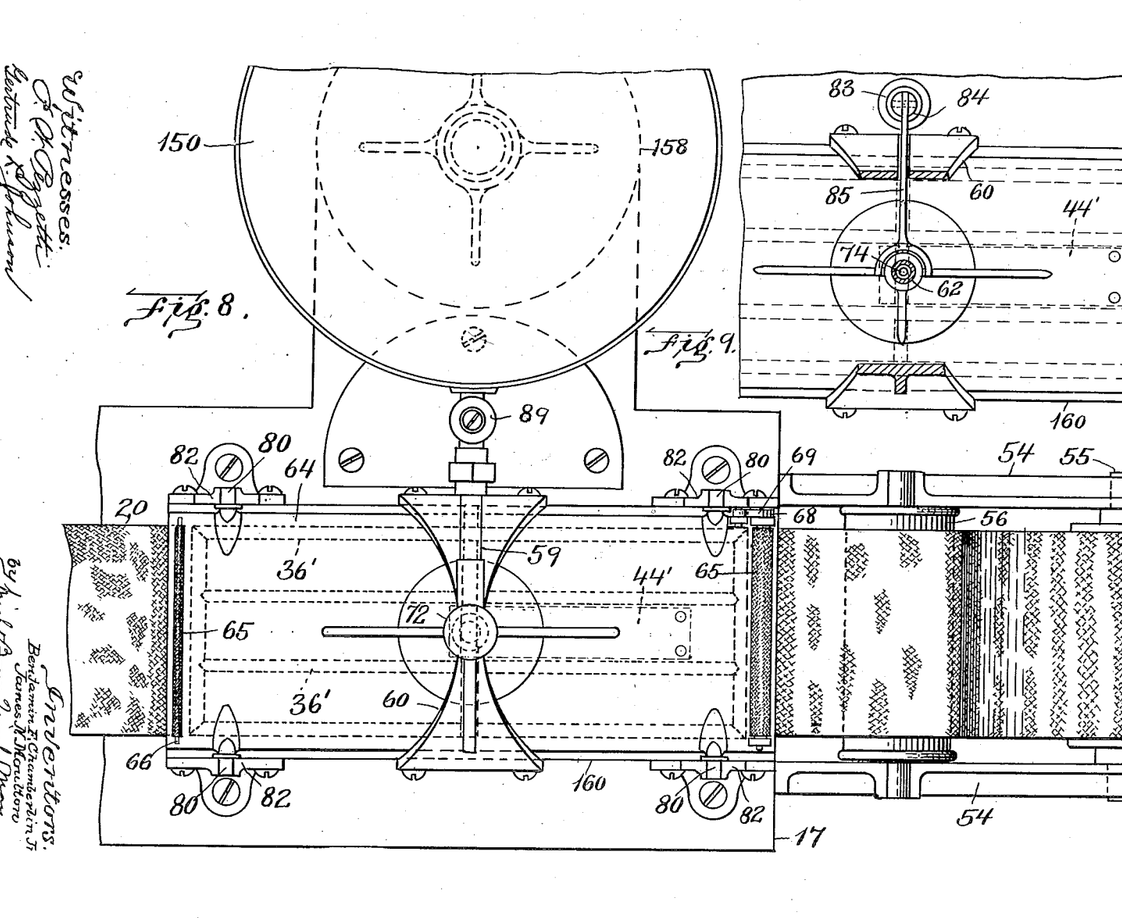
Fig. 8 represents a top plan view of the apparatus shown by Fig. 5.
Fig. 9 represents a horizontal section of a portion of the structure included in Fig. 8.
Figures 10, 11, 13, 14:
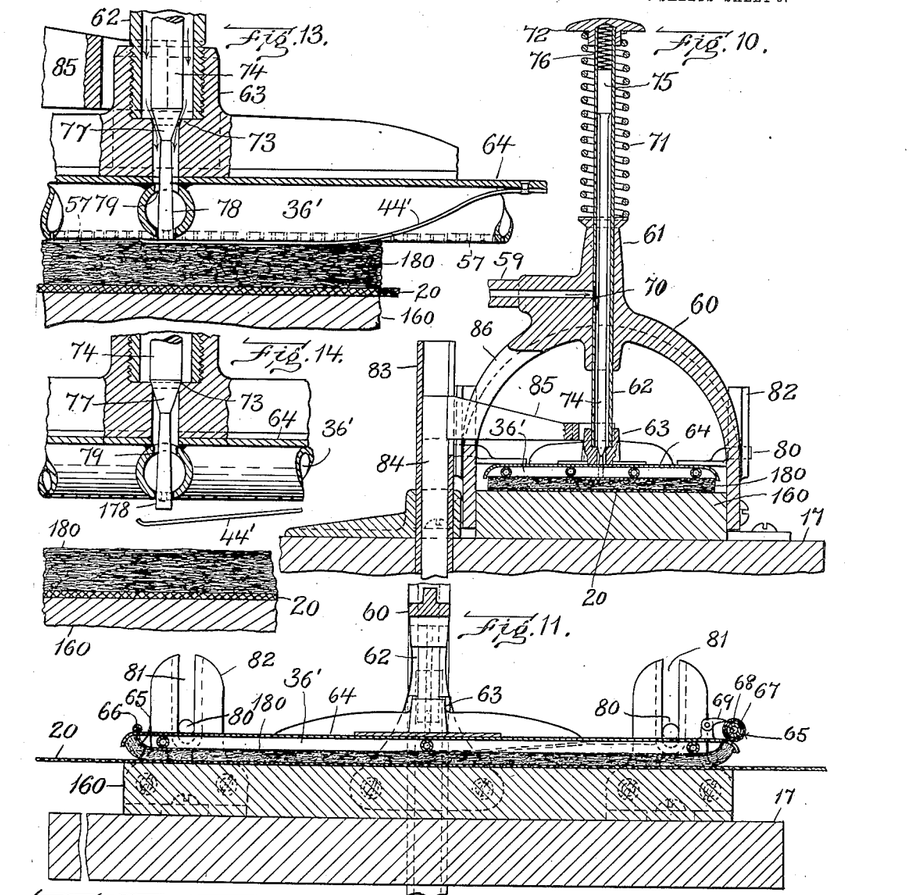
Fig. 10 represents a section of a portion of the apparatus on line 10—10 of Fig. 5.
Fig. 11 represents a vertical section in a plane at right angles to that of Fig. 10.
Fig. 13 represents a vertical section including fragments of the stationary work-support, the work, the movable body of absorbent material, the distributing device for the solvent and an automatic needle valve controlling the discharge of the solvent, the needle valve being open.
Fig. 14 represents a similar section of the same parts included in Fig. 13 but in a different position showing the needle valve closed.
Figure 12:
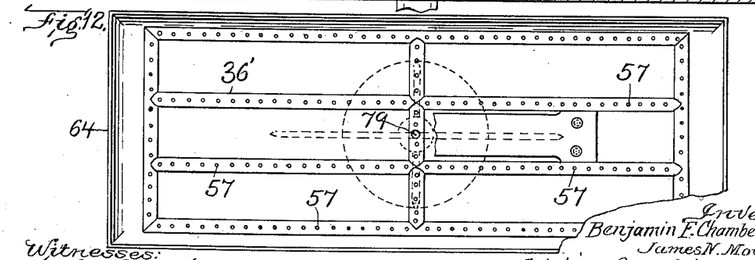
Fig. 12 represents an inverted plan view of a distributing device for the solvent.

In the form of apparatus illustrated by Figs. 5 to 14, the bed 160 remains stationary at all times and the body of the absorbent material 180 is moved down toward the bed to compress the strip 20. In this form the bed is mounted upon the bench 17 which is provided with brackets 54, adapted to support a spindle 55 about which the strip 20 is wound. The strip is guided from the spindle 55 to the bed 160 by an idle roll 56. In this form the distributing device which is indicated at 36' moves with the absorbent material toward and from the bed. As shown by Fig. 12, the distributing device is of rectangular form and is composed of a plurality of tubular branches extending longitudinally and transversely and provided with outlets 57 through which the solvent passes to the upper surface of the absorbent material. The distributing device and the absorbent material are engaged when solvent is discharged, and the solvent is therefore conducted to the absorbent material without exposure to the atmosphere. It is desirable to provide plates 58 (see Fig. 6) between branches of the distributing devices to provide an uninterrupted backing for the absorbent material. This form of apparatus comprises two valves for controlling the flow of solvent from the reservoir 150 to the distributing device. The reservoir is mounted upon a base 158 and discharges into a pipe 59 connected with a truss structure 60. The truss structure, as shown by Figs. 7 and 10, is formed with legs affixed at opposite sides of the bed 160 and is formed with a central vertical neck 61. The neck is centrally bored to receive a tube 62 of which the lower end is threaded in a nipple 63. The nipple is formed on or affixed to a plate 64 extending over the top surface of the distributing device 36' and the distributing device is therefore supported by the tube 62. The ends of the absorbent material 180 (see Fig. 11) are attached to strips 65 of which one is permanently attached to a rod or other fixture 66 on the plate 64 and of which the other is coiled about a winding roll 67 of a take-up. The roll 67 may be provided with a ratchet 68 to be engaged by a retaining pawl 69 all of which are supported by the plate 64. The absorbent material is therefore suspended by its ends and is adapted to move slightly toward and from the plate 64. The bore of the tube 59 communicates with the bore of the neck 61 and the tube 62 is provided with an aperture 70 which is adapted to register with the bore of the pipe 59 when the absorbent material is depressed but the end of the bore of the pipe 59 is closed by the tube 62 when the absorbent material is raised. Thus it will be seen that solvent may flow into the tube 62 only when the absorbent material is depressed. The tube 62 is normally raised by a spring 71 coiled about its upper end and compressed between the upper end of the neck 61 and a cap 72 at the upper end of the tube. The nipple 63 is centrally bored as shown by Figs. 13 and 14 and is provided with a shoulder 73 which is adapted to be engaged by a plunger 74 inclosed within the tube. The upper end of the plunger 74 is formed with a head 75 which is engaged by a spring 76 in the upper end of the tube 62. The plunger, with the exception of the head 75, is of less diameter than the diameter of the interior of the tube and an annular space is thus provided for the flow of the solvent from the aperture 70 to the shoulder 73. That portion of the plunger which engages the shoulder 73 is of conical form as indicated at 77 and constitutes a valve of which the shoulder is the valve seat. The lower end of the plunger is substantially reduced in diameter to form a valve stem 78. The valve stem extends through and below a branch of the distributing device 36' which is provided with an aperture 79 through which the solvent is admitted. A strip 44' is interposed between the lower end of the valve stem and the absorbent material and may be attached to the plate 64 as shown by Fig. 13.

Figures 5, 6:
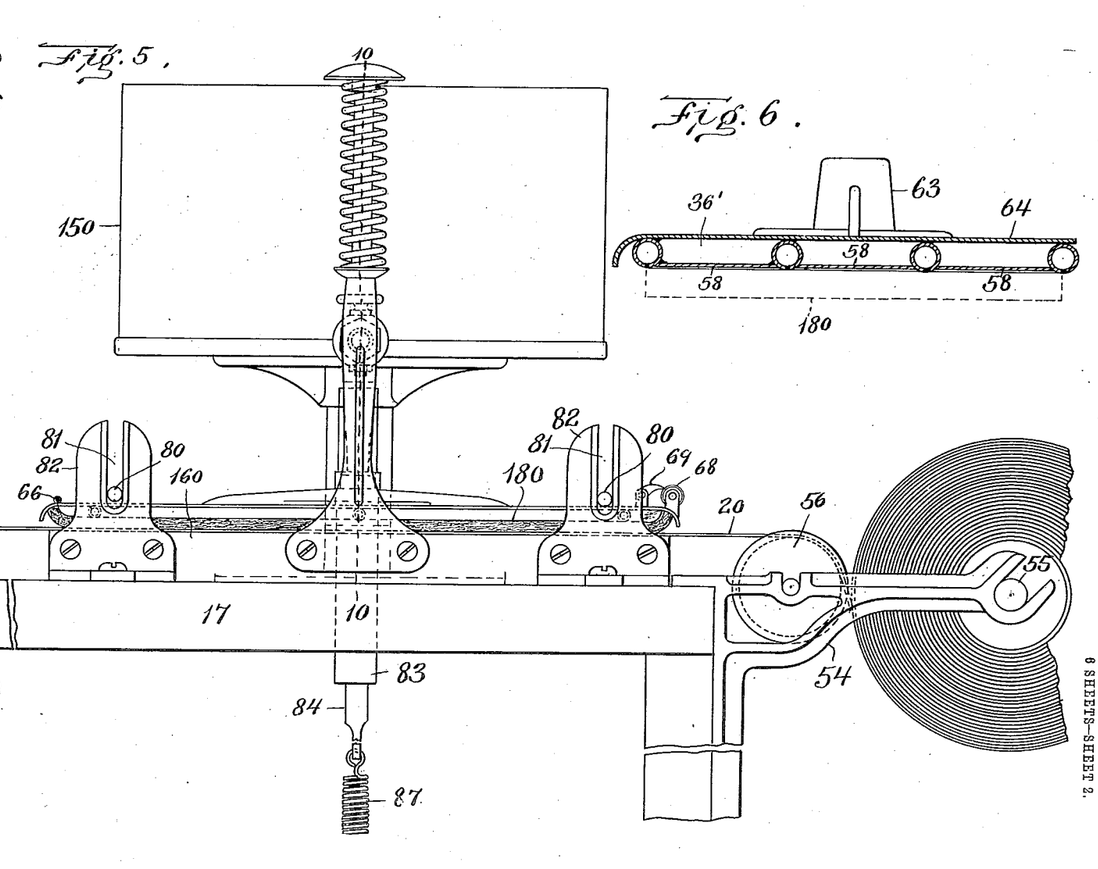
Fig. 5 represents an elevation of an apparatus for a similar purpose in which the lower or work-supporting member is stationary and in which the upper or absorbent member is manually movable.
Fig. 6 represents a transverse section of the means which supports and which distributes the solvent to the body of the absorbent material.

One manner of operating the apparatus last described may be as follows: After introducing the strip 20 between the bed 160 and the absorbent material 180 with the coated surface of the strip next to the absorbent material, the absorbent material may be placed in contact with the strip by depressing the head 72 of the tube 62. The absorbent material is thus pressed down upon the strip and the strip is compressed and flattened between the absorbent material and the bed, and the solvent with which the absorbent material is impregnated is applied to the coated surface of the strip. The strip may then be drawn through until a sufficient quantity thereof has received solvent from the absorbent material. When the absorbent material is thus depressed, the distributing device 36' is pressed upon the upper surface of the absorbent material. The strip 44' is raised relatively to the distributing device and the valve 77 is raised from its seat 73 because of engagement of the strip 44' with the lower end of the valve stem 78. The valve 77 is therefore opened simultaneously with the uncovering of the bore of the pipe 59 by the aperture 70 and a fresh supply of solvent from the reservoir 150 is thus permitted to flow to the absorbent material. When the pressure upon the head 72 ceases, the spring 71 raises the tube 62, thus covering the bore of the pipe 59, and raising the distributing device and absorbent material. The distributing device moves upward a short distance before the absorbent material is raised by its suspending strips and the valve 77 is thus permitted to return to its seat 73 and cut off communication between the interior of the tube and the distributing device. It is apparent that the supply of solvent is automatically cut off at two points between the pipe 59 and the distributing device when the latter is raised and the atmosphere is thus positively excluded from the solvent.

For the purpose of maintaining the distributing device and the pad of absorbent material in correct position with relation to the bed, the plate 64 may be provided with a plurality of fingers 80 extending laterally therefrom. The fingers are here shown as extending through vertical slots 81 formed in brackets 82 affixed upon the bench 17.

The drawings illustrate other mechanism by which the absorbent pad may be moved into engagement with the strip 20. Said mechanism includes a guide or tube 83 extending vertically through the bench 17, a plunger 84 arranged in the tube and an arm 85 extending laterally from the upper end of the plunger through an opening 86 in the truss structure 60. The free end of the arm 85 bestraddles the tube 62 and is adapted to engage the upper edge of the nipple 63 and thus depress the distributing device and the absorbent pad. As shown by Figs. 5 and 7, the lower end of the plunger 84 is connected to one end of a spring 87 of which the other end is engaged with a treadle lever 88. If desired, a hand valve 89 may be provided in the pipe 59 for controlling the flow of solvent from the reservoir to the tube 62.

In both forms of apparatus hereinbefore described, the controlling valve at the outlet of the conduit is opened by relative movement of the work support and the conduit. The absorbent pad in each form of the apparatus serves in this connection merely as an intermediary for transmitting the movement to the valve stem.

In the modification shown by Fig. 15, the pad does not serve as an element for opening the valve but instead thereof, the work or strip 20 is employed to engage the valve stem. In this modification the pad 180 may be affixed against the lower side of the distributing device 36' instead of being loosely suspended. The pad is formed with an opening for the reception of the valve stem 78 and the stem may be provided with a roll or rolls 178 to be engaged by the strip 20. It is immaterial whether the work support is moved toward and from the conduit or whether the conduit is moved toward and from the work support.

It will be noted that the reservoir is not provided with a vent. In practice it has been found that the apparatus operates successfully without a vent. The solvent fluid is not required in great volume and it generates sufficient gas to fill the vacuum which might otherwise occur.

The apparatus, in each of the two forms hereinbefore described, is constructed for use with a solvent which is highly volatile. It may be desirable to provide a coating material for the strip of fabric which may be rendered soft or adhesive by a solvent which is less volatile. For example, it may be desirable to employ the apparatus for softening or rendering adhesive a coating material for which water is a suitable solvent. In this event, it would be unnecessary to take extreme precautions to prevent evaporation of a solvent such as water, and, for this reason, the reservoir and the conduit for conducting the less volatile solvent from the reservoir to the absorbent pad may be provided with but a single valve for controlling the delivery to the pad.

Figure 16:
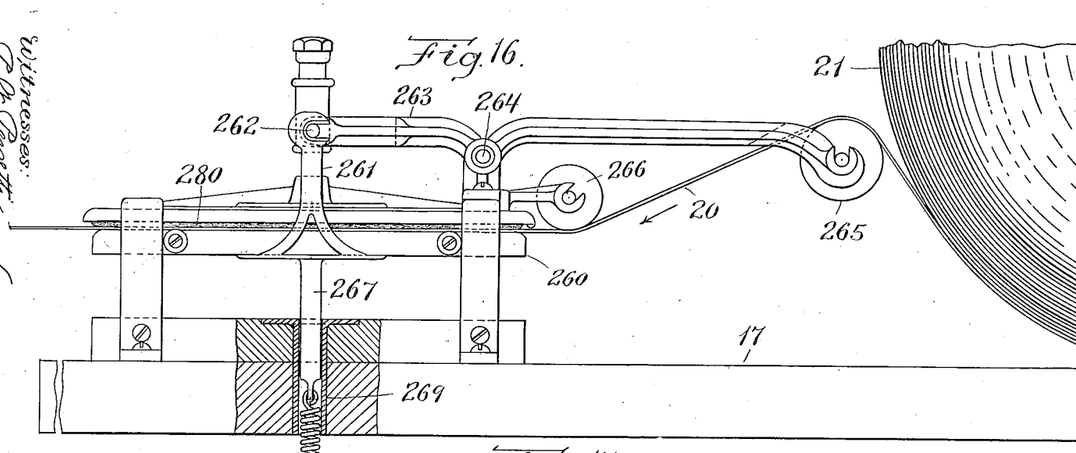
Fig. 16 represents an elevation partly in section of an apparatus, of which the movable member of the two coöperative work-engaging members is automatically moved to work-engaging position by tension applied to the work for the purpose of feeding it.
Figure 17:
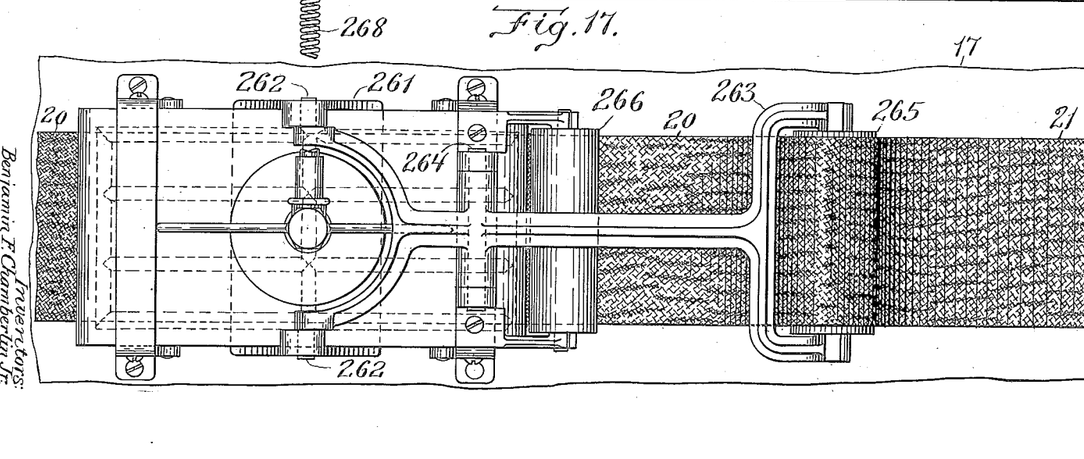
Fig. 17 represents a top plan view of the mechanism shown by Fig. 16.

The absorbent pad and the work-supporting member which reduce the coated strip to a flat state, may be provided with automatic mechanism for moving one toward and from the other instead of the manually operative means hereinbefore described. An apparatus of automatic character is illustrated by Figs. 16 and 17, and is so constructed as to be automatically operated by the coated strip when feeding tension is applied to the strip. In the latter form, the apparatus is arranged in a similar manner upon a bench or other supporting structure 17. The work support or bed is indicated at 260 and the absorbent pad is indicated at 280. In this form, the pad 280 is stationary and the bed 260 is moved toward and from the pad by the tension of the strip 20. The bed 260 is mounted in a yoke or hanger 261, and the hanger is suspended upon trunnions 262 at one end of a lever 263. The lever is fulcrumed between its ends, as indicated at 264, and its other end is provided with an idle roll 265 over which passes the strip 20. The roll 21, which is formed by the strip 20, is arranged upon the bench or any other support so that the tangent portion of the strip, leaving the roll 21, may pass over the roll 265 and exert a downward pressure upon said roll when the strip is drawn in the direction of the arrow. It is desirable to provide a chock or an abutment of some form to keep the roll 21 close to the roll 265 so that the inclination of the tangent portion of the strip between said rolls may always be inclined at a relatively steep angle. The strip 20 may be engaged by a stationary idle roll 266 between the roll 265 and the bed 260. If the weight of the bed 260 is not sufficient to normally depress it, the hanger 261 may be provided with a stem 267 and the stem may be connected to a spring 268 exerting downward tension. The stem may be arranged in the sleeve 269 in the bench 17 and may be guided thereby. It will be presumed that the solvent is delivered to the pad 280 in either of two ways hereinbefore described. The bed 260 is normally separated from the pad 280. When the outer end of the strip 20 is drawn in the direction of the arrow, the tension of the strip depresses the roll 265, thus rocking the lever 263 on its fulcrum 264. In this way the bed 260 is raised to the position illustrated and the strip is thereby pressed between the bed and the pad 280. So long as the strip is subjected to feeding tension, the bed will be held in its elevated position, but when the feeding tension ceases, the bed is free to descend.

Having thus explained the nature of our said invention and described a way of making and using the same, although without attempting to set forth all of the forms in which it may be made or all of the modes of its use, we declare that what we claim is:

1. In an apparatus of the character specified, a work support, a reservoir, a conduit arranged to conduct liquid from said reservoir the discharge end of said conduit being arranged over said work support, a valve arranged in said conduit, an absorbent pad arranged between said discharge end and work support and movable toward and from said discharge end, means arranged to communicate movement of said pad to said valve to open the latter, and means arranged to cause relative movement of said work support and discharge end, one toward the other, whereby said pad may be moved relatively to said discharge end to open said valve.

2. In an apparatus of the character specified, a work support, a reservoir, a conduit arranged to conduct liquid from said reservoir the discharge end of said conduit being arranged over said work support, said work support and discharge end being relatively movable one toward and from the other, an absorbent pad arranged between said work support and discharge end, said pad and discharge end being relatively movable, one toward and from the other, a valve in said conduit, and means operable by such relative movement of said pad and discharge end for opening said valve.

In testimony whereof we have affixed our signatures, in presence of two witnesses.

BENJAMIN F. CHAMBERLIN, JR.
JAMES N. MOULTON.

Witnesses:
W. P. ABELL,
P. W. PEZZETTI.